Figure 1:
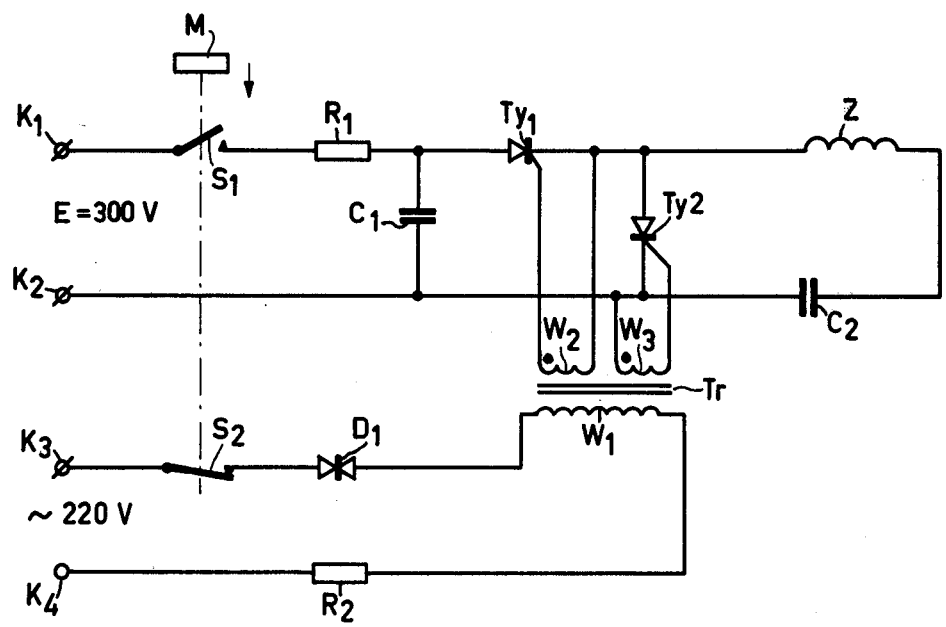

United States Patent [19]

Schylander

[11] 4,153,858
[45] May 8, 1979

[54] DEMAGNETIZATION ARRANGEMENT

[75] Inventor: Erik C. Schylander, Stockholm, Sweden

[73] Assignee: U.S. Philips Corporation, New York, N.Y.

[21] Appl. No.: 867,012

[22] Filed: Jan. 5, 1978

[30] Foreign Application Priority Data

Jan. 14, 1977 [SE] Sweden ................. 7700356

[51] Int. Cl.² .............................................. H01F 13/00
[52] U.S. Cl. ........................................ 315/8; 361/150
[58] Field of Search ............................ 315/8; 361/150

[56] References Cited

U.S. PATENT DOCUMENTS 3,733,524  5/1973  Cooksey et al. ..................... 361/150

FOREIGN PATENT DOCUMENTS 44-10413  5/1969  Japan ............................................. 315/8
1164786   9/1969  United Kingdom .................... 361/150
212366    5/1968  U.S.S.R. ....................................... 315/8

Primary Examiner—Eugene R. LaRoche
Attorney, Agent, or Firm—Thomas A. Briody; William J. Streeter; Henry I. Steckler

[57] ABSTRACT

A circuit arrangement for the demagnetization of color television receivers, in particular small battery fed receivers, comprising first switch means for charging a first capacitor immediately before demagnetization and second switch means adapted to be activated after the charging of said first capacitor for causing the capacitor to discharge through the demagnetization coil with short lasting current pulses of alternating direction. The arrangement comprises a second and smaller capacitor, which is charged and discharged by the current flowing through the demagnetization coil, this sequence being repeated in cyclic order.

14 Claims, 2 Drawing Figures

DEMAGNETIZATION ARRANGEMENT

The invention relates to a circuit arrangement for the demagnetization of colour television receivers by means of a time decreasing A.C. current through a demagnetization coil disposed on the colour picture tube, comprising a first capacitor and first switch means adapted to connect the capacitor to a D.C. current source in a time interval immediately before the demagnetization during a sufficiently extended time for charging the capacitor, and further comprising second switch means adapted to connect the capacitor across the demagnetization coil in a time interval after the charging of said capacitor and after disconnecting it from the D.C. current source for producing a current pulse through the coil, the arrangement being such in operation that a train of such current pulses alternatingly occur with a different direction and an amplitude decreasing with respect to zero as a result of the discharge of the capacitor through the coil.

Such a demagnetization is usually effected each time immediately after the switching on of the receiver. The decreasing alternating current can according to a known technique be produced by means of a circuit connected to the A.C. mains and comprising the demagnetization coil and a PTC-resistor in series therewith. The function of this known demagnetization circuit is that, each time the receiver is switched-on, a high alternating current is flowing from the mains through the resistor and the coil immediately after the switching-on, the PTC-resistor being cold and having consequently a low resistance. In due course when the PTC-resistor is heated, as a result of the current therethrough, its resistance value increases and the current through the coil decreases. In the final condition, when the resistor is wholly heated, the current through the demagnetization coil is so small that it has no effect, so that a disconnection of the series circuit comprising the coil and the PTC-resistor is not necessary.

In receivers fed by a battery there may, however, be problems with the demagnetization due to the high power momentaneously required during the demagnetization. In such receivers there is a converter, which for example transforms a battery voltage of 12 V to 220 V A.C. voltage. Whilst the normal power consumption for a battery fed colour TV receiver is for example 70 Watts, the peak power during the demagnetization can for example amount to 1500 Watts. This involves in practice a short-circuiting of the converter. In order to solve this problem known battery fed receivers are provided with a device, which during a short limited time interval after the switching-on of the receiver reduces the A.C. voltage applied to the demagnetization coil and the PTC-resistor. The voltage reduction is chosen such that the converter can resist the instantaneous power peak arising due to the short-circuiting of the output of the converter by the demagnetization circuit. The voltage applied to the demagnetization circuit during the time interval immediately after the switching-on may for example be a third of the normal A.C. voltage. This involves a decrease of the demagnetization power but the demagnetization can still be sufficient to be acceptable. In particular in smaller apparatuses, in which the converter has a lower capacity, it may, however, be impossible to produce effective demagnetization with this known method.

It is an object of the invention to provide a demagnetization circuit which is fully effective independently of the instantaneous capacity of the voltage source used for the supply of the circuit.

The circuit arrangement is according to the invention characterized by a second and smaller capacitor, which is connected in series with the demagnetization coil, the said second switch means being adapted to alternately form a closed series circuit comprising the first capacitor, the demagnetization coil and the second capacitor, and a closed series circuit comprising the demagnetization coil and the second capacitor, respectively.

The circuit arrangement according to the invention is based upon the known effect that sufficient amount of energy for demagnetization can first be stored in the first capacitor by the charging thereof and that this energy can thereafter be used for producing high short lasting current pulses through the demagnetization coil, whereby the instantaneous peak power in this current pulses can be very high without having any negative effect. An advantage with the circuit according to the invention is that the A.C. character of the current through the coil is automatically obtained because the charging and the discharging currents of the second capacitor, which currents form the demagnetization A.C. current, always will have opposite directions. Furthermore the switch means do not have to interrupt any current because the discharging of the first capacitor and the charging of the second capacitor automatically cease when the same voltage prevails on both capacitors, so that the change of state of the switch means can be effected in current-less condition.

Figure 2:
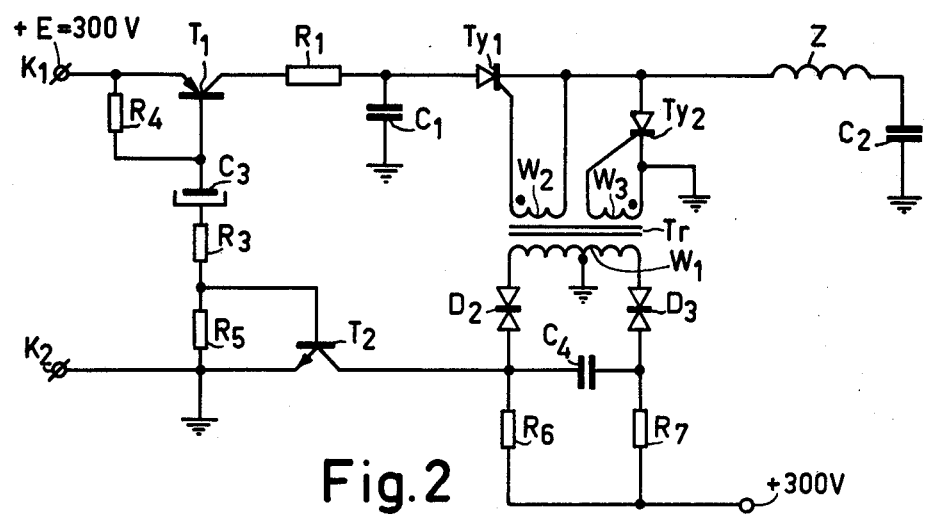

The invention is illustrated by means of an example and with reference to the drawing, in which FIGS. 1 and 2 show two different embodiments of a circuit according to the invention.

In FIG. 1 reference $C_1$ designates a first capacitor, which can be charged via two D.C. current terminals $K_1$, $K_2$ through a resistor $R_1$ and a manually actuatable switch $S_1$. In parallel across the capacitor $C_1$ there is a series circuit consisting of a second capacitor $C_2$ and a demagnetization coil Z, which coil surrounds the colour picture tube in a battery fed colour TV receiver (not shown). In the connection path between Z and one plate of the capacitor $C_1$ there is a thyristor $Ty_1$ while the second plate of $C_1$ is connected directly to $C_2$. In parallel across the series circuit Z, $C_2$ there is a second thyristor $Ty_2$. The thyristors $Ty_1$ and $Ty_2$ are controlled in such a way that they are in conductive condition alternately but not simultaneously.

A control circuit for the thyristors $Ty_1$ and $Ty_2$ comprises a transformer Tr with a primary winding $W_1$ and two secondary windings $W_2$, $W_3$ and furthermore a trigger diode $D_1$ and a resistor $R_2$ in series with the winding $W_1$. This series arrangement can be connected to a source of A.C. voltage present at two terminals $K_3$, $K_4$ via a switch $S_2$. The switch $S_2$ is controlled by the same actuation push button M as the push button controlling the switch $S_1$. In the unactuated condition of the push button M the two switches $S_1$ and $S_2$ are assuming the shown position, in which $S_1$ is open and $S_2$ is closed. When the push button M is actuated $S_1$ is closed and $S_2$ is opened.

The voltage present at the terminals $K_3$, $K_4$ is suitably the operation voltage of 220 V, 50 Hz supplying the apparatus and delivered by a converter connected to the battery. The D.C. voltage fed to the D.C. voltage terminals $K_1$, $K_2$ is suitably a voltage obtained by peak rectification of the said A.C. voltage and thus amounting to 300 V.

The thyristors $Ty_1$ and $Ty_2$ are controlled by the voltages appearing across the secondary windings $W_2$, $W_3$ of the transformer Tr. The said secondary windings are for this purpose connected between the cathode and the control electrode of the respective thyristor in such manner that the voltages at the control electrodes of the thyristors are 180° phase shifted with respect to each other.

The arrangement of FIG. 1 functions as follows.

A short time after the switching-on of the apparatus and after the building-up of the voltages amounting to 220 V A.C. current and 300 V D.C. current the actuation push button M is actuated during a short time period, so that the switch $S_1$ is closed and the switch $S_2$ is opened. The push button M is kept pressed during a time period, which is longer than the time constant of the circuit $R_1$, $C_1$, for example during a few seconds, so that the capacitor $C_1$ is fully charged to 300 V. When the push button is then released the capacitor $C_1$ is disconnected from its D.C. current supply, while instead the control circuit for the thyristors $Ty_1$ and $Ty_2$ receives operation voltage amounting to 220 V A.C. When during the first half period of the A.C. voltages of 50 Hz after the closing of $S_2$ the voltage on the terminals $K_3$, $K_4$ exceeds the threshold voltage for the trigger diode $D_1$, for example 30 V, a current pulse flows through the winding $W_1$, which current pulse is transformed to the secondary windings and for example causes the thyristor $Ty_1$ to be triggered to conductive condition. When this occurs the series circuit comprising the charged capacitor $C_1$, the demagnetization coil Z and the non-charged capacitor $C_2$ is closed. Electric charge is transferred from $C_1$ to $C_2$ and current flows through the coil Z. The peak current through the coil Z is proportional to the potential difference between $C_1$ and $C_2$ and in this case amounts to $E/R_z$, where E is the voltage of the D.C. current source (300 V) and $R_z$ is the resistance value of the coil Z. The charging of $C_2$ continues until both capacitors have assumd the same potential equal to $C_1/(C_1+C_2)E=U_2$. The thyristor $Ty_1$ then switches to unconductive condition.

When during the next following half period of the 50 Hz A.C. voltage this voltage again exceeds the threshold voltage of the trigger diode $D_1$ a current pulse flows through the primary winding $W_1$ in opposite direction. This current pulse is transformed to the secondary windings and causes the thyristor $Ty_2$ to be triggered to conductive condition. Then the series circuit comprising the capacitor $C_2$ and the coil Z is closed so that the capacitor $C_2$ is discharged. The discharge current passes through the coil Z and has the opposite direction as compared with the charging current during the preceeding half period. The peak current during the discharging of $C_2$ is equal to $U_2/R_z$. When the capacitor $C_2$ is discharged the thyristor $Ty_2$ becomes unconductive.

During the following half periods of the 50 Hz A.C. voltage the thyristors $Ty_1$ and $Ty_2$ are ignited alternately and the described sequence of first discharging of the capacitor $C_1$ and charging of $C_2$ and then discharging of $C_2$ is repeated, each time starting from a lower voltage value as compared with that of the foregoing cycle. After a number of periods of the A.C. voltage the capacitor $C_1$ is wholly discharged and the whole operation sequence ceases. If there is no disconnection of the control circuit for the thyristors $Ty_1$ and $Ty_2$ these thyristors will continuously be retriggered to conductive condition, which, however, has no negative effect whilst the power consumption in the control circuit is negligible.

The voltage reduction at the alternately occurring charging and discharging of the capacitor $C_2$ is as mentioned equal to $C_1/(C_1+C_2)$. The decay speed, i.e. the speed with which the A.C. current through the coil Z approaches zero, is thus determined by the ratio $C_2/C_1$. The capacitance of the capacitor $C_2$ must therefore be smaller than that of the capacitor $C_1$. The voltage reduction for each charging and discharging of $C_2$ can for example amount to approximately 10%. In an example was:

$E = 300$ V.

$R_1 = 4$ kΩ.

$C_1 = 25$ μF.

$C_2 = 4$ μF.

$Z = 23$Ω and 14 mH.

FIG. 2 shows a second embodiment of a demagnetization circuit of the same type as in FIG. 1, wherein an A.C. source is not needed. In FIG. 2 one can recognize the capacitors $C_1$, $C_2$, the demagnetization coil Z, the resistor $R_1$, the thyristors $Ty_1$ and $Ty_2$ and the transformer Tr. The switch $S_1$ of FIG. 1 is in FIG. 2 replaced by a transistor $T_1$, while the function of the switch $S_2$ is fulfilled by a second transistor $T_2$. The transistors $T_1$ and $T_2$ are included in a time constant circuit, which is connected across the D.C. current source of $E=300$ V and comprises the emitter-base path of $T_1$, a capacitor $C_3$, a resistor $R_3$ and the base-emitter path of $T_2$. Two resistors $R_4$, $R_5$ of high value are connected between the emitter and the base of the transistor $T_1$ and $T_2$, respectively, for preventing leakage current through the capacitor $C_3$ from passing into the respective transistor after the charging of $C_3$. The transformer Tr is according to FIG. 2 driven by an oscillator circuit consisting of two branches comprising a resistor $R_6$ and $R_7$, respectively, in series with a trigger diode $D_2$ and $D_3$, respectively, and a capacitor $C_4$ connected between the connection points between the trigger diode and the resistor in the respective branch. The interconnected ends of the resistors $R_6$, $R_7$ are connected to the positive D.C. voltage terminal having 300 V, while at the opposite end of the said branches each trigger diode is connected to an end of the primary winding $W_1$ having in this case an earthed central tap. The terminal $K_2$ is also earthed.

The operation is that as soon as the apparatus is switched-on and a D.C. voltage appears between the terminals $K_1$ and $K_2$ a current flows through the emitter-base path of the transistor $T_1$, the capacitor $C_3$, the resistor $R_3$ and the base-emitter path of the transistor $T_2$. Both transistors $T_1$ and $T_2$ are conductive and the capacitor $C_3$ is being charged with a time constant determined by $R_3$, $C_3$. As a result of the conductive condition of the transistor $T_1$ the capacitor $C_1$ is also being charged, which is effected through the resistor $R_1$. The time constant of $R_3$, $C_3$ is chosen to be higher than the time constant of $R_1$, $C_1$ so that the capacitor $C_1$ has reached the fully charged condition when the capacitor $C_3$ is still under charging. As a result of the fact that the transistor $T_2$ is conductive the connection point between the resistor $R_6$ and the trigger diode $D_2$ is kept on earth potential and current flows through the resistor $R_7$ and the trigger diode $D_3$, which diode is thus conductive. The capacitor $C_4$ is only charged to a value equal to the voltage drop across the trigger diode $D_3$. This condition will prevail as long as the transistor $T_2$ is conductive, i.e. during the charging of capacitor $C_3$.

When the capacitor $C_3$ is wholly charged, the current through the transistors $T_1$ and $T_2$ ceases and both transistors switch-over to the cut-off condition. The capacitor $C_1$ is hereby likewise as in FIG. 1 disconnected from the voltage source. At the same time the point of connection between the trigger diode $D_2$ and the resistor $R_6$ is disconnected from earth. A current flows then through the resistor $R_6$, the capacitor $C_4$ and the conductive trigger diode $D_3$. Hereby the capacitor $C_4$ is charged with a positive voltage on the plate connected to the trigger diode $D_2$. When the voltage on the capacitor $C_4$ has reached the threshold voltage of the diode $D_2$, for example 30 V, the diode $D_2$ becomes conductive. Then the polarity of the voltage across the trigger diode $D_3$ reverses and this diode $D_3$ switches over to non-conductive condition. The capacitor $C_4$ is now charged in opposite direction through the current circuit comprising $R_7$ and the conductive diode $D_2$. When the voltage across the capacitor $C_4$ reaches the threshold value for the trigger diode $D_3$ the said diode $D_3$ is again conductive and the trigger diode $D_2$ switches over to the non-conductive condition. Thus, the circuit oscillates with a period determined by the time constants of $R_6$, $C_4$ and $R_7$, $C_4$. Each time one trigger diode is made conductive and the second one is made non-conductive a current pulse flows through the primary winding $W_1$ of the transformer Tr, whereby one of the thyristors $Ty_1$ or $Ty_2$ is triggered to conductive condition. By this alternate triggering of the thyristors a decreasing demagnetization current will be obtained through the coil Z in the same manner as in FIG. 1.

The thyristors $Ty_1$ and $Ty_2$ operating in counterphase form a switch with make-and-break function which can, if desired, be replaced by a mechanical switching contact, for example controlled by a relay in an "magneto-bell connection". In principle also other switch arrangements are possible with a discharge of the first capacitor through the demagnetization coil with an alternating direction of the current therethrough.

What is claimed is:

1. A circuit arrangement for the demagnetization of colour television receivers by means of a time decreasing A.C. current through a demagnetization coil disposed on the colour picture tube, said circuit comprising a first capacitor, first switch means for coupling the capacitor to a D.C. current source in a time interval immediately before the demagnetization during a sufficiently extended time for charging the capacitor and for thereafter uncoupling said capacitor from said D.C. current source, second switch means for coupling the capacitor across the demagnetization coil in a time interval after the charging of said capacitor and after said uncoupling of said capacitor from the D.C. current source for producing a train of current pulses alternatingly occurring with a different direction and an amplitude decreasing with respect to zero as a result of the discharge of the capacitor through the coil, and a second capacitor having a smaller value than said first capacitor coupled in series with the demagnetization coil, said second switch means alternatively forming a closed series circuit comprising the first capacitor, the demagnetization coil, and the second capacitor, and a closed series circuit comprising the demagnetization coil and the second capacitor, respectively.

2. Colour television receiver comprising a demagnetization circuit arrangement as claimed in claim 1.

3. A circuit arrangement as claimed in claim 1, wherein said second switch means is controlled from said first switch means so that it starts its cyclic operation for producing current pulses through the coil when said first switch means returns to a position in which the first capacitor is disconnected from the D.C. source after having been charged thereby.

4. A circuit arrangement as claimed in claim 3, wherein said first switch means comprises a switch which is manually actuatable by mns of a push button and adapted to be kept actuated a given time period during which the first capacitor is connected to the D.C. current source for being charged, said second switch means being controlled by the same push button for being kept unactivated as long as the push button is actuated for charging of the first capacitor and being actuated at the ceasing of the actuation of the bush button.

5. A circuit arrangement as claimed in claim 3, further comprising a time constant circuit, and wherein said first switch means comprises an electronically controllable switch element controlled by said time constant circuit starting at the switching on of the television receiver for charging of the first capacitor during a certain given time period after said switching-on of the receiver, the time constant of said time constant circuit being larger than the charging time constant for the first capacitor, said second switch means being controlled by the same time constant circuit so that they are kept unactivated during the charging of the first capacitor.

6. A circuit arrangement as claimed in claim 5, wherein said first switch means comprises a transistor.

7. A circuit arrangement as claimed in claim 1, wherein said second switch means includes a third switch means for closing the circuit comprising the series connection of the demagnetization coil and the second capacitor and a fourth switch means for connecting said circuit to one plate of the first capacitor, the second plate thereof being permanently connected to the series connection of the coil and the second capacitor.

8. A circuit arrangement as claimed in claim 7, wherein said third and fourth switch means comprise two controllable electronic switches respectively, the third one being connected in parallel across the series circuit comprising the demagnetization coil and the second capacitor, while the fourth one is connected in the current path between said series circuit and the first capacitor, said switches being controlled for being alternately conductive.

9. A circuit arrangement as claimed in claim 6, wherein said third and fourth switch means each comprises a thyristor.

10. A circuit arrangement as claimed in claim 8, wherein said electronically controllable switches are controlled by a common A.C. current signal for being triggered to conductive condition in a different half period of said A.C. current.

11. A circuit arrangement as claimed in claim 10, wherein said A.C. current is derived from the operation A.C. voltage of the receiver.

12. A circuit arrangement as claimed in claim 10, further comprising a separate free-oscillating oscillator circuit means for producing said A.C. signal.

13. A circuit arrangement as claimed in claim 10, further comprising a control circuit for each controllable switch, each including a secondary winding of a transformer, the primary winding being coupled to the A.C. current signal source.

14. A circuit arrangement as claimed in claim 10, wherein the A.C. current path of said A.C. current signal includes a trigger diode.

* * * * *